United States Patent [19]

Nakajima

[11] Patent Number: 4,931,697
[45] Date of Patent: Jun. 5, 1990

[54] POWER SUPPLY CIRCUIT FOR AUTOMOTIVE BRAKE LAMP

[75] Inventor: Yoshihiro Nakajima, Kanagawa, Japan

[73] Assignee: Nissan Motor Co., Ltd., Japan

[21] Appl. No.: 393,099

[22] Filed: Aug. 3, 1989

Related U.S. Application Data

[63] Continuation of Ser. No. 104,119, Oct. 5, 1987, abandoned.

[30] Foreign Application Priority Data

Oct. 7, 1986 [JP] Japan ................... 61-238436

[51] Int. Cl.$^5$ .................................... B60Q 1/00
[52] U.S. Cl. ......................... 315/77; 315/80; 362/61; 362/80; 340/479
[58] Field of Search ............... 315/77, 80, 84; 362/61, 362/80; 219/203; 307/10.8; 340/479

[56] References Cited

U.S. PATENT DOCUMENTS

| | | | |
|---|---|---|---|
| 3,949,361 | 4/1976 | Replogle | 315/77 |
| 4,399,347 | 8/1983 | Schmitt | 219/203 |
| 4,656,563 | 4/1987 | Segoshi et al. | 362/61 |

*Primary Examiner*—Robert J. Pascal
*Attorney, Agent, or Firm*—Leydig, Voit & Mayer

[57] ABSTRACT

A power supply control circuit for selectively supplying electrical power to either a first high-mount lamp installed on a detachable body component of an automotive vehicle body or a second high-mount lamp installed on a main body component thereof has a relay and two diodes. The relay establishes the communication between the second high-mount lamp and a power source in response to turning ON of a brake switch when the detachable body component is opened or removed from the main component and blocks the communication when it is closed. In this circuit, the power source applies voltage to relay coil via an ignition switch and one of the diodes or via the brake switch and the other of the diodes, so as to prevent electricity from continuously passing through the relay coil when the detachable body component is opened or removed from the vehicle body for a long time.

14 Claims, 3 Drawing Sheets

POWER SUPPLY CIRCUIT FOR AUTOMOTIVE BRAKE LAMP

This application is a continuation of application Ser. No. 07/104,119, filed Oct. 5, 1987, abandoned.

BACKGROUND OF THE INVENTION

1. (FIELD OF THE INVENTION)

The present invention relates generally to a power supply circuit for an electrical equipment or device to be mounted on a movable or detachable component of an automotive vehicle. More specifically, the invention relates to a power supply circuit for a high-mount brake lamp, a rear defogger and so forth installed on a detachable rear vehicle body component.

2. (DESCRIPTION OF THE BACKGROUND ART)

High-mount brake lamps are known to be effective for causing drivers of vehicles to the rear to notice application of the brakes. Such high-mount brake lamps are generally mounted or installed on a rear portion of the vehicle at higher elevation than the rear combination lamps. High-mount lamps are generally designed to be turned ON in synchronism with brake lamps in the rear combination lamps upon application of the brakes.

When this type of high-mount brake lamp is installed on a vehicle of the type which has a detachable rear vehicle body component, installation of another high-mount lamp will be desirable so that a high-mount brake lamp is provided even after the detachable rear body component is removed from main and permanent body component. In such cases, electric power has to be supplied selectively to one of the two high-mount lamps.

SUMMARY OF THE INVENTION

It is therefore a principal object of the present invention to provide a power supply circuit for an electrical equipment mounted on a detachable body component of an automotive vehicle.

It is further object of the invention to provide a power supply circuit for supplying electric power selectively to an electrical equipment on a major component of an automotive vehicle body and an electric equipment in a detachable component of the vehicle body.

It is still further object of the invention to provide a power supply circuit for supplying electric power selectively to a high-mount lamp on a major component of an automotive vehicle body or a high-mount lamp on a detachable component of the vehicle body.

In order to accomplish the aforementioned and other specific objects, a power supply control circuit for selectively supplying electrical power to either a first high-mount lamp installed on a detachable body component of an automotive vehicle body or a second high-mount lamp installed on a main body component thereof includes a relay and two diodes. The relay establishes the communication between the second high-mount lamp and a power supply in response to turning ON of a brake switch when the detachable body component is opened or removed from the main component and blocks the communication when it is closed. In this circuit, the power supply applies voltage to relay coil via an ignition switch and one of the diodes or via the brake switch and the other of the diodes, so as to prevent electricity from continuously passing through the relay coil when the detachable body component is opened or removed from the main body component for a long time.

According to one aspect of the present invention, the power supply control circuit for selectively supplying electrical power to one of a first electrical equipment installed on a detachable body component of an automotive vehicle body and a second electrical equipment installed on a main component of the automotive vehicle body, the circuit comprising:

a power supply;

a manually operable switch connected to the power supply;

an ignition switch connected to said power supply;

first means for establishing a first communication between the first electrical equipment and the power supply at a first position in which the detachable body component is closed for causing the power supply to supply an electrical power to the first electrical equipment in response to turning ON of the manually operable switch;

second means for establishing a second communication between the second electrical equipment and the power supply at a second position of the detachable body component is opened or removed from said main component for causing the power supply to supply electrical power to the second electric equipment in response to turning ON of the manually operable switch;

third means, associated with the second means, for establishing a third communication between the second means and the power supply at the second position of the detachable body component when one of the manually operable switch and the ignition switch is ON and for blocking the third communication when both of the manually operable switch and the ignition switch are OFF.

The second means may comprise a first relay which includes a first relay coil, a first stationary terminal connected to the second electrical equipment, a second stationary terminal and a movable contact. In this case, when electricity passes through the first relay coil, the communication between the movable contact and the first stationary terminal is established, so that the communication between the second electrical equipment and the manually operable switch is established. On the other hand, when electricity does not pass through the first relay coil, communication is established between the movable contact and the second stationary terminal.

The third means may prevent electricity from passing the first relay coil at the second position of the detachable body component when said manually operable switch is OFF. Preferably, third means includes a first diode and an ignition switch, which are provided between the power supply and the first relay coil so that electricity passes through the relay coil in response to turning ON of the ignition switch. The third means may also include a second diode provided between the first relay coil and the manually operable switch so that electricity passes through the first relay coil in response to turning ON of the manually operable switch. The detachable body component may be hinged at the top. In this case, the position of the detachable body component may be the first position when the detachable body component is closed and is the second position when the detachable body component is opened. The detachable body component may also be removed from the main component of the vehicle body. In this case, the position of the detachable body component is the second position when the detachable body component is removed from the main component of the vehicle body.

Preferably, the first means includes first and second connectors provided on both sides of the first electrical equipment. Each of the connectors may comprise two segments, one of which is installed on the detachable body component and the other of which is installed on the main component of the vehicle body. The segments of the connector may be releasably connected to each other while the detachable body component is closed. The connection between two segments may be broken when the detachable body component is opened or removed from the main component of the vehicle body.

The manually operable switch may comprise a brake switch, which is associated with a brake pedal to be turned ON in response to depression of the brake pedal for application of the brake, and each of the electrical equipment may be a high-mount brake lamp. In this case, one of the high-mount brake lamps is preferably mounted on the detachable body component at higher elevation than the rear combination lamps and the other of the high-mount brake lamps is preferably mounted on the inner roof panel of the vehicle body at the rear end.

A rear defogger may also be mounted on the rear window of the detachable body component. In this case, the rear defogger may be in communication with the power source via a second relay comprising a second relay coil and a normally open contact which is closed when electricity passes through the second relay coil. The rear defogger is preferably connected to the power supply via the normally open contact. In addition, the second stationary terminal of the first relay coil is preferably connected to the power supply via the second relay coil and a rear defogger switch. As a result, the rear defogger may be turned ON when the detachable body component is closed in response to turning ON of the rear defogger switch. In addition, a connector is preferably provided between the rear defogger and the normally open contact. The connector may comprise two segments, one of which is installed on the detachable body component and the other of which is installed on the main component of the vehicle body. The two segments of the connector may be releasably connected to each other while the detachable body component is closed. The connection between two segments is broken when the detachable body component is opened or removed from the main component of the vehicle body.

DESCRIPTION OF THE PREFERRED EMBODIMENT

Figure 1:
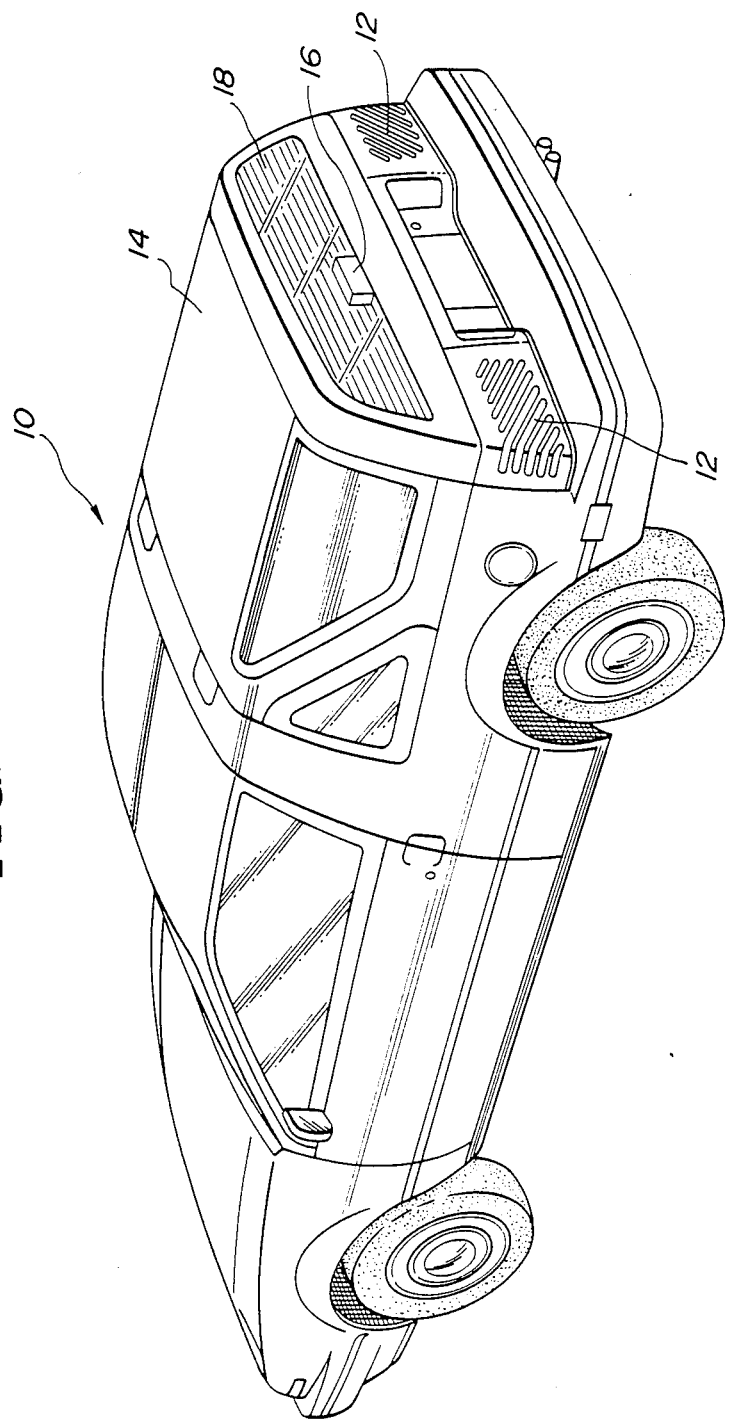
FIG. 1 is a perspective view of an automotive vehicle in which a detachable body component is installed on a major component of the vehicle body.
Figure 2:
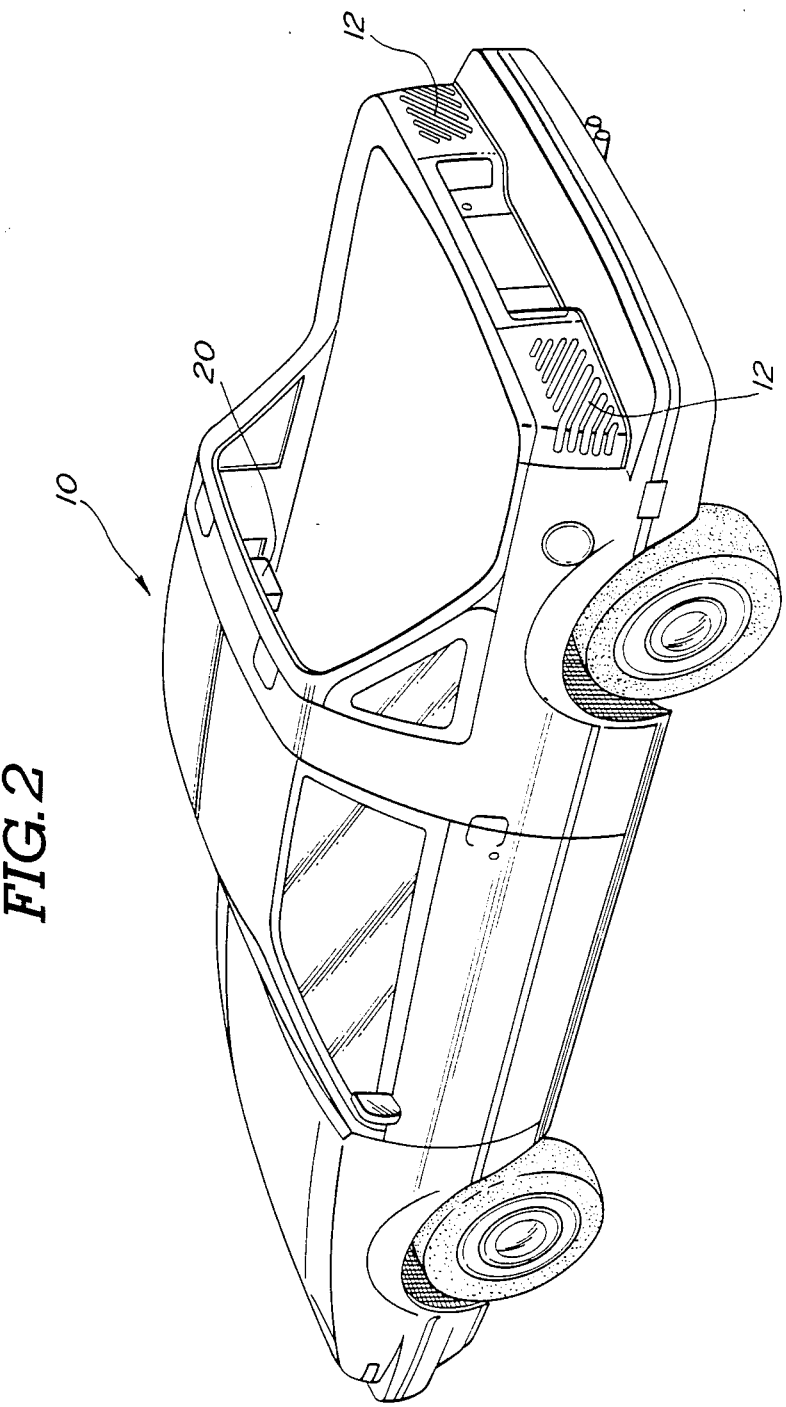
FIG. 2 is a perspective view of the automotive vehicle shown in FIG. 1, in which the detachable body component is removed from the major component of the vehicle body.

Referring now to the drawings, particularly to FIGS. 1 to 2, a detachable rear body component 14 is installed on the rear end portion of a vehicle body 10 for covering rear portion of the vehicle compartment. The detachable body component 14 is designed to hinge upwardly and downwardly about the axis at the front-top end thereof to be opened and closed. The detachable rear body component 14 can be removed from the major component of the vehicle body 10. A pair of combination lamps including brake lamps 12 are mounted on the rear outer panel of the vehicle body 10. The brake lamps 12 turn on when a vehicular brake is applied so as to cause the driver of the following vehicles to realize that the vehicular brakes have been applied. A high-mount brake lamp 16 is installed on the rear window of the detachable body component 14 at a little higher elevation than that of the combination lamps, i.e. at a lower portion of the rear window. When the rear body component 14 is closed, the high-mount brake lamp 16 is turned on in response to application of the vehicular brake in synchronism with brake lamps 12 in the rear combination lamps. The detachable rear body component 14 may also be provided with a rear defogger 18 on the rear window. While the detachable rear body component 14 is closed, the rear defogger 18 may become active in response to turning ON of a rear defogger switch.

As shown in FIG. 2, the detachable rear body component 14 can also be removed from the main and permanent body component of the vehicle body 10. When the rear body component 14 is removed from the main body component of the vehicle body 10 to make the rear portion of the vehicular compartment open, it is still preferable to provide high-mount brake lamp so that the drivers of the following vehicles may notice application of the brake. For this reason, another high-mount brake lamp 20 is installed at rear end of the main body component of the vehicle body 10. In practice, the high-mount brake lamp 20 is mounted on the inner panel of the vehicle body 10 at the rear end thereof. When detachable rear body component is removed from the main body component of the vehicle body 10, the high-mount brake lamp 20 and the brake lamp 12 are synchronously turned on in response to application of the brake.

Figure 3:
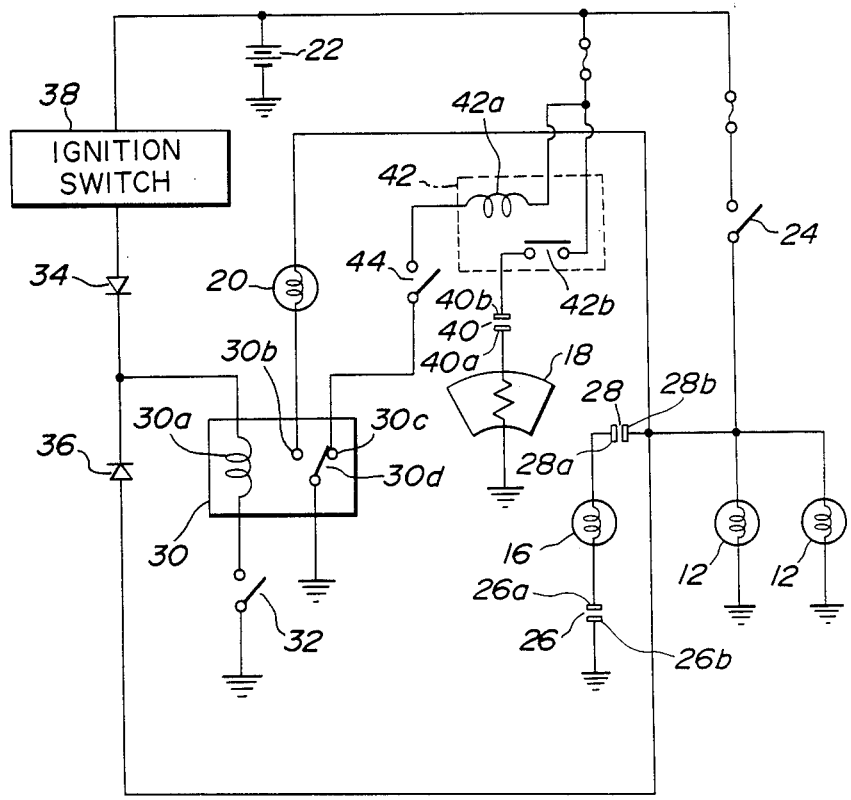
FIG. 3 is a block diagram of the preferred embodiment of a power supply circuit according to the present invention.

In order to selectively supply an electric power to one of the high-mount brake lamps 16 and 20, a power supply control circuit is provided. The preferred embodiment of a power supply control circuit for automotive brake lamps, according to the present invention, is shown in FIG. 3.

One terminal of each of the brake lamps 12 is connected to ground and the other terminals thereof are connected to the positive terminal of a brake battery 22 via a brake switch 24. As is well known, the brake switch 24 is associated with a brake pedal to be turned ON in response to depression of the latter for application of the brake. The negative terminal of the battery 22 is connected to ground. Therefore, the brake lamps 12 are turned on when the brake switch 24 is closed.

One terminal of the high-mount brake lamp 16 is connected to ground via a connector 26. The connector 26 may comprise two segments 26a and 26b, one of which is installed on the detachable rear body component 14 and the other of which is installed on the main component of the vehicle body 10. The segment 26a installed on the detachable rear body component will be hereafter referred to as "coupler terminal" and the other segment 26b installed on the main component of the vehicle body 10 will be hereafter referred to as "connector terminal". The coupler terminal 26a and the connector terminal 26b of the connector 26 are releasably connected while the detachable rear body component is closed. The connection between the coupler terminal 26a and the connector terminal 26b is broken when the detachable rear body component 14 is opened or removed from the main component of the vehicle body 10. The other terminal of the high-mount brake lamp 16 is connected to the positive terminal of the battery 22 via 0 the brake switch 24 and a connector 28 which comprises a coupler terminal 28a installed on the detachable rear body component 14 and a connector terminal 28b installed on the main component of the vehicle body 10. The connection between the coupler terminal 28a and the connector terminal 28b is also broken when the detachable rear body component 14 is opened or removed from the main component of the vehicle body 10. Therefore, the high-mount lamp 16 is turned on in response to turning ON of the brake switch 24 when the detachable rear body component 14 is closed, but it remains turned off even if the brake switch 24 turns ON when the detachable rear body component 14 is opened or removed from the main component of the vehicle body 10.

One terminal of the high-mount brake lamp 20 is connected to the positive terminal of the battery 22 via the brake switch 24. The other terminal thereof is connected to a stationary terminal 30b of a relay 30 which comprises a relay coil 30a, the stationary terminal 30b, a stationary terminal 30c and a movable contact 30d. The movable contact 30d is connected to ground and is movable between the stationary terminals 30b and 30c due to the exciting force of the relay coil 30a. The movable contact 30d is in communication with the terminal 30b when electricity passes through the relay coil 30a and is in communication with the terminal 30c when electricity does not pass through the relay coil 30a. One end of the relay coil 30a is connected to ground via a switch 32 which turns ON when the detachable rear body component 14 is opened or removed from the main component of the vehicle body 10. The other end of the relay coil 30a is connected to cathodes of diodes 34 and 36. The anode of the diode 34 is connected to the positive terminal of the battery 22 via an ignition switch 38. The anode of the diode 36 is also connected to the positive terminal of the battery 22 via the brake switch 24. Therefore, when the detachable rear body component 14 is opened or removed from the main component of the vehicle body 10, electricity passes through the relay coil 30a in response to turning ON of the ignition switch 38 or the brake switch 24. As a result, the movable contact 30d is in communication with the stationary terminal 30b. Under these conditions, the high-mount brake lamp 20 may be turned on in response to turning ON of the brake switch 24.

One end of the rear defogger 18 is connected to ground and the other end thereof is connected to the positive terminal 22 via a connector 40 and a normally open contact 42a of a relay 42. The connector 40 comprises a coupler terminal 40a installed on the detachable rear body component 14 and a connector terminal 40b installed on the main component of the vehicle body 10. The connection between the coupler terminal 40a and the connector terminal 40b is broken when the detachable rear body component 14 is opened or removed from the main component of the vehicle body 10. The relay 42 comprises a relay coil 42a and the normally open contact 42b. The normally open contact 42b is closed when electricity passes through the relay coil 42a. One end of the relay coil 42a is connected to the positive terminal of the battery 22 and the other end thereof is connected to the terminal 30c of the relay 30 via a rear defogger switch 44. Therefore, when the detachable rear body component 14 is closed, the rear defogger 18 turns ON in response to turning ON of the rear defogger switch 44. On the other hand, when the detachable rear body component 14 is opened or removed from the main component of the vehicle body 10, the rear defogger 18 remains OFF even if the rear defogger switch 44 is turned ON.

The operation of the aforementioned power supply control circuit, according to the present invention, is described below.

When the detachable rear body component 14 is closed, the switch 32 is OFF and the respective connections between the coupler terminals 26a, 28a and 40a and the connector terminals 26b, 28b and 40b of the connectors 26, 28 and 40 are established. When the switch 32 is OFF, electricity does not pass through the relay coil 30a of the relay 30. Therefore, the movable contact 30d of the relay 30 is in communication with the stationary terminal 30c thereof and is not in communication with the stationary terminal 30b thereof. In this condition, when the brake switch 24 is turned ON, the brake lamps 12 and the high-mount brake lamp 16 are turned on, but the high-mount brake lamp 20 remains turned off. In addition, when the detachable rear body component 14 is closed, electricity passes through the relay coil 42a of the relay 42 in response to turning ON of the rear defogger switch 44, so that the normally open contact 42b of the relay 42 is closed, thereby the rear defogger 18 turns ON.

On the other hand, when the detachable rear body component 14 is opened or removed from the main component of the vehicle body 10, the switch 32 turns ON and the connection of the connector 26, 28 and 40 are broken. Under these conditions, when the ignition switch 38 is turned ON, electricity passes through the diode 34 and the relay coil 30a of the relay 30. As a result, the movable contact 30d of the relay 30 is in communication with the terminal 30b thereof and is not in communication with the terminal 30c thereof. Under these conditions, when the brake switch 24 is turned ON, the brake lamp 12 and the high-mount brake lamp 20 are turned on, but the high-mount brake lamp 16 remains OFF. While the ignition switch 38 is OFF, electricity does not pass through the relay coil 30a of the relay 30 unless the brake switch 24 is turned ON. In this case, when the brake switch 24 is turned ON, electricity passes through the diode 36 and the relay coil 30a of the relay 30. As a result, the movable contact 30d of the relay 30 is in communication with the stationary terminal 30b thereof. Therefore, electricity passes through the high-mount brake lamp 20 via the brake switch 24, so that the high-mount brake lamp 20 is turned on together with the brake lamps 12. Furthermore, when the detachable rear body component 14 is opened or removed from the main component of the vehicle body 10, the connection between the coupler terminal 40a and the connector terminal 40b of the connector 40 is broken. Therefore, the rear defogger 18 does not turn ON even if the rear defogger switch 44 is turned ON.

As mentioned above, according to the preferred embodiment of a power supply control circuit of the present invention, electricity does not pass through the relay coil 30a of the relay 30 unless the ignition switch 38 or the brake switch 24 is turned ON while the detachable rear body component is opened or removed from the main component of the vehicle body 10. Therefore, it can prevent unnecessary consumption of power from the battery 22 from increasing and prevent the battery from dying when the detachable rear body component is opened or removed from the main component of the vehicle body 10 for a long time.

According to the present invention, two switching transistors may be substituted for the relay 30 so that either the high-mount brake lamp 20 or the rear defogger switch 44 is selectively connected to ground in accordance with opening and closing of the switch 32. Furthermore, other electrical equipments may be substituted for the high-mount brake lamps 16 and 20 and rear defogger 40.

What is claimed is:

1. A high-mount brake lamp arrangement for an automotive vehicle having a detachable body component comprising:
   a first high-mount brake lamp mounted on a detachable body component of a vehicle for external observation when the detachable body component is installed on the vehicle;
   a second high-mount brake lamp mounted on the vehicle in the vicinity of the detachable body component for external observation when the detachable body component is removed;
   a power supply;
   a manually operable switch connected to said power supply and to a vehicle brake pedal to be turned ON responsive to application of the brake pedal;
   an ignition switch connected to said power supply;
   first means for establishing a first communication between said first high-mount brake lamp and said manually operable switch while the detachable body component is installed for causing said power supply to supply electrical power to said first high-mount brake lamp to illuminate said first high-mount brake lamp in response to turning ON said manually operable switch;
   second means for establishing a second communication between said second high-mount brake lamp and said manually operable switch while the detachable body component is opened or removed from the vehicle body for causing said power supply to supply electrical power to said second high-mount brake lamp in response to turning ON said manually operable switch; and
   third means, associated with said second means, for establishing a third communication between said second high-mount brake lamp and said power supply while the detachable body component is open or removed when one of said manually operable switch and said ignition switch is ON, thereby illuminating said second high-mount brake lamp, and for blocking said third communication when both of said manually operable switch and said ignition switch are OFF.

2. A lamp arrangement as set forth in claim 1 wherein said second means comprises a first relay which includes a first relay coil and which establishes the second communication between said second high-mount brake lamp and said manually operable switch in response to turning ON of said manually operable switch when electricity passes through said first relay coil.

3. A lamp arrangement as set forth in claim 2 wherein said third means prevents electricity from passing through said first relay coil when said detachable body component is removed when both of said manually operable switch and said ignition switch are OFF.

4. A lamp arrangement as set forth in claim 3 wherein said third means includes a first diode provided between said ignition switch and said first relay coil so that electricity passes through said first relay coil in response to turning ON of said ignition switch.

5. A lamp arrangement as set forth in claim 3 wherein said third means includes a second diode provided between said first relay coil and said manually operable switch so that electricity passes through said first relay coil in response to turning ON of said manually operable switch.

6. A lamp arrangement as set forth in claim 4 wherein said third means includes a second diode provided between said first relay coil and said manually operable switch so that electricity passes through said first relay coil in response to turning ON of said manually operable switch.

7. A lamp arrangement as set forth in claim 1 wherein said first means includes first and second connectors provided on both sides of said first high-mount brake lamp, each of said connectors comprising two segments, one of which is installed on the detachable body component and the other of which is installed on the vehicle, said segments of said connectors being releasably connected to each other while the detachable body component is closed, and wherein the connection between two segments is broken when the detachable body component is opened or removed from the vehicle.

8. A lamp arrangement as set forth in claim 7 wherein said manually operable switch comprises a brake switch which is associated with a brake pedal to be turned ON in response to depression of said brake pedal for application of the brake.

9. A lamp arrangement as set forth in claim 8 wherein one of said high-mount brake lamps is mounted on said detachable body component at higher elevation to rear combination lamps and the other of said high-mount brake lamps is mounted on an inner roof panel of said vehicle body at the rear end.

10. A lamp arrangement as set forth in claim 8 wherein a rear defogger is mounted on a rear window of said detachable body component.

11. A lamp arrangement as set forth in claim 10 wherein said rear defogger is in communication with said power source via a second relay comprising a second relay coil and a normally open contact which is closed when electricity passes through said second relay coil.

12. A lamp arrangement as set forth in claim 11 wherein said second means includes a first relay having a second stationary terminal, wherein said rear defogger is connected to said power supply via said normally open contact, and said second stationary terminal of said first relay is connected to said power supply via said second relay coil and a rear defogger switch so that said rear defogger turns ON when said detachable body component is installed in response to turning ON of said rear defogger switch.

13. A lamp arrangement as set forth in claim 12 wherein a connector is provided between said rear defogger and said normally open contact, said connector comprising two segments, one of which is installed on the detachable body component and the other of which is installed on the vehicle, said two segments of said connector being releasably connected while the detachable body component is installed, and wherein the connection between two segments is broken when the detachable body component is opened or removed from the vehicle.

14. A lamp arrangement for an automotive vehicle having a detachable rear gate closure which is detachably mounted on a rear gate opening of a vehicular body comprising:

- a first lamp means mounted on said detachable rear gate closure for external observation when said detachable rear gate closure is mounted on said rear gate opening;
- a second lamp means mounted on the vehicular body in the vicinity of said rear gate opening for external observation when said detachable rear gate closure is removed;
- a power supply circuit;
- a manually operable switch connected to said power supply circuit associated with a braking arrangement to be turned ON in response to application of a vehicular brake;
- first means for establishing electrical communication between said first lamp means and said manually operable switch while said detachable rear gate closure is in installed position for illuminating said first lamp means in response to turning ON of said manually operable switch;
- second means for establishing electrical communication between said second lamp means and said manually operable switch while said detachable rear gate closure is removed from said rear gate opening; and
- third means associated with said second means for blocking electrical communication while both an ignition switch and said manually operable switch are turned OFF and responsive to turning ON of one of said manually operable switch and said ignition switch for illuminating said second lamp means.

* * * * *